UNITED STATES PATENT OFFICE.

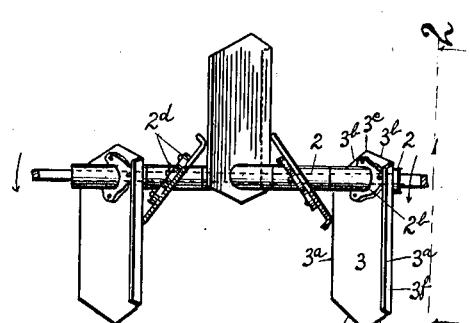
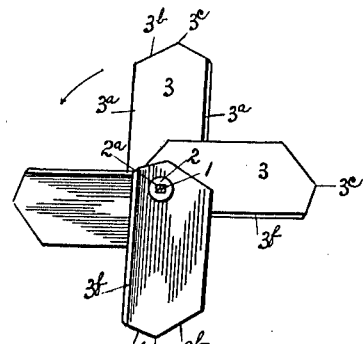
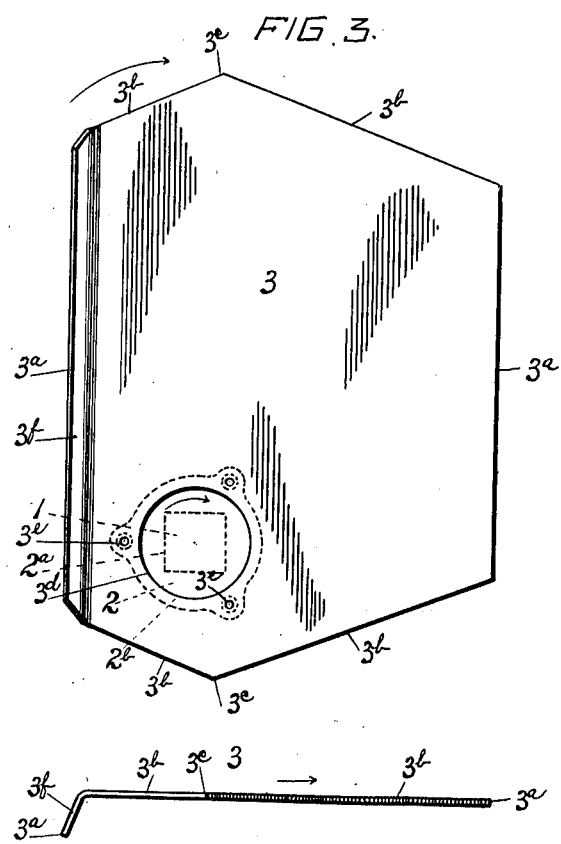

STARLEY S. SWANSON, OF BELLEVUE, OHIO.

FERTILIZER-DISTRIBUTER.

1,270,070.			Specification of Letters Patent.		Patented June 18, 1918.

Application filed September 20, 1917. Serial No. 192,407.

*To all whom it may concern:*

Be it known that I, STARLEY S. SWANSON, a citizen of the United States, residing at Bellevue, in the county of Huron and State of Ohio, have invented certain new and useful Improvements in Fertilizer-Distributers, of which the following is a specification.

My invention relates to improvements in fertilizer distributers, and more particularly to the provision of a novel and improved beater or distributer device adapted to coöperate with the usual delivery cylinders of manure or fertilizer spreaders, whereby to more thoroughly and evenly distribute the manure or fertilizer from the machine over an area of greater width than the width of the machine.

Another object of the invention is the provision of a generally improved fertilizer beater or distributer of this class, which will be exceedingly simple in construction, cheap of manufacture, and efficient in use.

A further object is the provision of an improved beater or distributer blade of substantially oblong or irregular hexagonal form, which by reason of such construction will present straight edges and relatively sharp corners so arranged and positioned as to more effectively engage and disintegrate the material being spread, and to throw the same laterally beyond the wheels of the machine, as well as constructed to more readily free the blades from the material and to permit the latter to be thrown and distributed freely without retention upon or by the blades.

A still further object is the provision of an improved form of rotary blade supporting and driving shaft, together with improved means for removably mounting and arranging the distributer blades at a proper angle of incidence relative to the plane of rotation of such blades on such supporting and driving shaft.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification, Figure 1, is a plan view of a section of the improved fertilizer distributer constructed in accordance with my invention.

Fig. 2, an end view of the same, taken on line 2,—2, of Fig. 1.

Fig. 3, an enlarged plan view of one of the distributer blades, detached.

Fig. 4, an end or edge view of the same.

Similar numerals of reference designate like parts throughout all the figures of the drawings.

The improved blade supporting and driving shaft 1, is adapted to be mounted and driven in the usual well known and understood manner at the rear of the main distributing cylinders or mechanism, and forming no part of this invention need not be described.

As a convenient means of removably receiving and supporting the improved distributer blades hereinafter described, the intermediate or blade supporting portion of the shaft 1, is preferably of angular or square shape in cross section as indicated most clearly in Fig. 2, of the drawings, said angular form of the shaft 1, being adapted to receive and carry a plurality of blade supporting and spacing sleeves 2, having angular openings $2^a$, similar to the angular form of the shaft 1, and as a convenient means of mounting and causing the distributer blades to be presented at a proper angle of incidence relative to their plane of rotation on the shaft, said sleeves 2, are provided with angular extending flanges $2^b$, the latter being preferably provided with bolt receiving openings, for the attaching elements or bolts $2^d$, used in securing the blades in a proper angular position.

It will be observed that the sleeves 2, are of such length that when arranged in abutting relation to each other they act as spacing sleeves for spacing the blades in proper relative position.

The improved distributer blades 3, are preferably made of oblong or irregular hexagonal form as shown, thereby presenting like sides $3^a$, and similarly shaped coincident angular ends $3^b$, terminating in angular points or corners $3^c$, all of which have been found of particular advantage and service in engaging and disintegrating the particles of fertilizer as received from the main delivery cylinders.

As the means of eccentrically mounting the distributer blades 3, upon the supporting and spacing sleeves 2, and the rotatable shaft 1, each blade is provided near one end and side with an opening $3^d$, adapted to loosely receive and contain one of the supporting and spacing sleeves 2, and as a convenient means of attaching the blades to the attaching flanges $2^b$, said blades may be provided with bolt receiving openings $3^e$, and adapted to register with the attaching elements or bolts $2^d$, in the flanges $2^b$, hereinbefore described.

The rear edge of each working face of each distributer blade preferably terminates in a laterally extending flange $3^f$, and it will be understood that one-half of the blades preferably have their working faces inclined toward one side of the machine and the other half toward the other side of the machine in a well known and understood manner, and common to this class of machines so that the material will be thrown to both sides equally.

From the foregoing description, taken in connection with the accompanying drawings, the operation and advantages of my invention will be readily understood.

Having thus described one of the embodiments of my invention, what I claim and desire to secure by Letters Patent, is,—

1. An oblong hexagonal distributer blade including similarly shaped angular ends.

2. An oblong hexagonal distributer blade made up of like sides and similarly shaped coincident angular ends.

3. A fertilizer distributer, comprising an angular driving shaft, and angularly extending abutting sleeved flanges and distributer blades removably mounted thereon.

4. An oblong hexagonal distributer blade having like parallel sides and similarly shaped angular ends, one of said sides being provided with a laterally extending flange.

5. A fertilizer distributer, comprising a rotatable angular shaft, blade spacing abutting bearing sleeves having similarly shaped angular openings mounted thereon and provided with circumferentially inclined flanges, and similarly inclined distributer blades attached to said flanges.

In testimony whereof I have affixed my signature in the presence of two witnesses.

STARLEY S. SWANSON.

Witnesses:
B. B. HATHAWAY,
D. SELTZER.